April 9, 1957     M. H. SCHMITT     2,788,514
BATTERY AND BRAKE ALARM SIGNAL SYSTEM
Filed Oct. 11, 1954
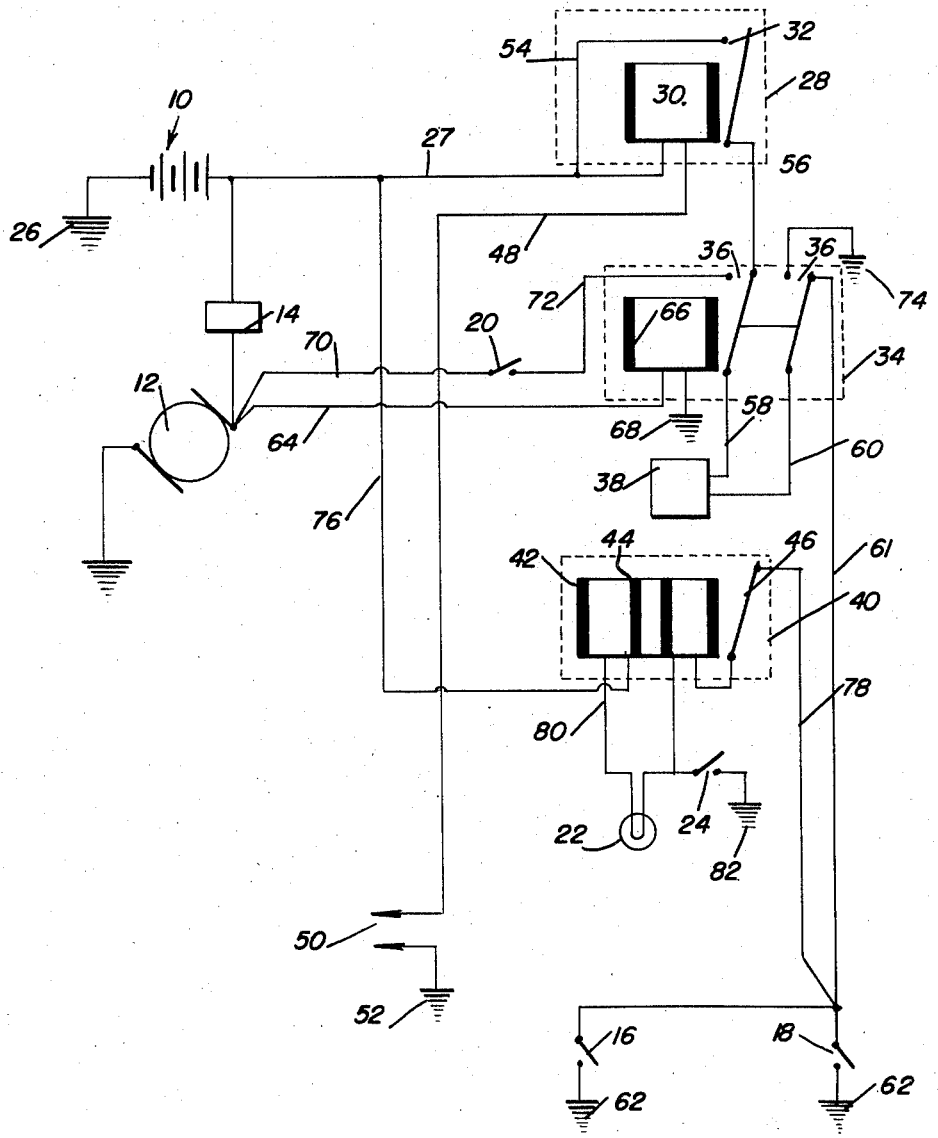
Marvin H. Schmitt
INVENTOR.
BY

United States Patent Office 2,788,514
Patented Apr. 9, 1957

2,788,514

BATTERY AND BRAKE ALARM SIGNAL SYSTEM

Marvin H. Schmitt, Warsaw, Ill.

Application October 11, 1954, Serial No. 461,401

1 Claim. (Cl. 340—52)

This invention relates to signal circuits adapted to be utilized in conjunction with various components of an automotive vehicle, and more particularly to a battery and brake alarm signal system.

The primary object of the present invention resides in the provision of means for sounding an alarm when a motorist, having stopped the engine of the vehicle which he is operating, opens the driver's seat door to leave the vehicle while a current consuming device is still operating.

A further object of the invention resides in the provision of means for providing a warning signal if the emergency brake is still on after the engine has been brought up to operating speed.

A further object of the invention resides in the provision of means for insuring against discharged batteries and overheated brakes by providing warning that an unsatisfactory condition exists.

The invention features the utilization of a low resistance relay connected between the battery and load which is designed to function when current of an amount sufficient to operate a current consuming device such as the ignition, radio, heater, headlights or the like is flowing therethrough. The closing of this relay completes a circuit to a signal device whenever a second relay connected to be energized whenever the generator is operating is in an open position. Whenever the generator is operating and the second relay is in a closed position, the circuit to the signal device completed by the closing of the first relay is broken. Thus, while the generator is in action, this prevents the operation of the signal device during those periods when current is being consumed while the driver's seat door is open.

Still further objects and features of this invention reside in the provision of a battery and brake alarm signal system that is simple to install, highly efficient in operation, and capable of functioning whether or not a dome light or other special current consuming device is operative or not.

These, together with the various ancillary objects and features of the invention which will become apparent as the following description proceeds, are attained by this battery and brake alarm signal system, a preferred embodiment of which is shown in the figure in the accompanying drawings, by way of example only.

With continuing reference to the accompanying drawing, reference numeral 10 generally designates the battery of a conventional automotive vehicle which is to be provided with the battery and brake alarm signal system comprising the present invention. The vehicle is also provided with a generator 12 having a cut-out 14 as well as door actuated switches, as at 16 and 18, and an emergency brake actuated switch 20. The vehicle may also be provided with a dome light 22 as well as a switch 24 for actuating the dome light.

The battery has one terminal thereof connected to ground, as at 26, and has the other terminal connected through conductor 27 to a first relay 28. The relay 28 is so arranged that the coil 30 thereof operates to complete a circuit through the switch contacts 32. The second relay 34 is also provided, which serves to operate a double-pole, double-throw switch 36, the contacts of which are connected across a signal device 38, such as an alarm bell, buzzer or the like. A third relay 40 is provided which is constructed with opposed coils 42 and 44 wound upon a single coil. The relay serves to control the switch contacts, as at 46.

The battery and brake alarm signal system functions as follows: when current is being consumed while the generator 12 is not generating current and one of the driver's seat doors is open thus closing either of the switches 16 or 18, current flows from the battery 10 through the lead 27 through relay coil 30 and through the conductor 48 to the load, as at 50, the load being a current consuming device, and to ground, as at 52. Upon excitation of the coil 30 and the closure of the contacts 32, an operative electrical circuit from the battery 10 through lead 27 through conductor 54 to the switch contacts 32 and through conductor 56, conductor 58 and the signal device 38, and thence through conductor 60, and conductor 61 to ground, as at 62, through the door switches 16 or 18, whichever of these switches is closed, causes the signal device 38 to operate and warn the motorist about to leave his vehicle that a current consuming device is still connected. If, however, both of the switches 16 and 18 are open, no signal will be provided.

Since the operator of the vehicle will, of course, prefer not to have a signal when taking on or discharging passengers while the vehicle engine is operating, when the generator 12 is operating, current flows from the generator 12 through lead 64 and through the coil 66 of relay 34 to ground, at 68. This closes the relay switch contacts 36, and the circuit is now broken from the battery 10 to the signal device 38 through the switch contacts 32 and 36, thereby preventing a signal from sounding as long as the generator continues energizing relay coil 66.

When the motorist attempts to operate the car with thet emergency brake on, and with the switch 20, of course, closed, a signal is given by current flowing from the generator 12 through lead 70 through the switch 20 through lead 72 and through the switch contacts 36 since the coil 66 is energized and to the signal device through conductor 58, through the signal device 38 and the conductor 60 to ground, as at 74. Since only the emergency brake will operate the signal device 38 when the driver's seat doors are closed, the motorist has thus been informed that the emergency brake has not been disengaged.

To prevent the dome light from operating the signal device 38, the dome light 22 is connected between the two opposite polarity coils 42 and 44 of the relay 40. When the driver's seat door is opened, current flows from the battery 10 through lead 76 through coil 44 of relay 40 then through coil 42, and through the normally closed switch contacts 46 of the relay 40, and through the lead 78 to ground through the door switches 16 and 18. Since coils 42 and 44 create opposite polarity, the switch contacts 46 continue to remain in their normally closed position. When the dome circuit switch 24 is closed, current flows from the battery through the lead 76 through coil 44 through lead 80 to the dome light 22 and switch 24 to ground, as at 82. This closes the relay 40 and opens its normally closed switch. The circuit is now broken to the lead 78 preventing the dome light switch ground 82 from completing a circuit from the signal device 38. The windings of the relay 40 are large enough to prevent any noticeable dimming of the dome light 22.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An automobile battery and brake alarm signal system for providing a warning signal upon actuation of a door controlled switch when a power consuming load device is consuming power, with provision for said warning signal not becoming operative when said power consuming load device is consuming power while the generator is charging and with further provision for said warning signal becoming operative when the emergency brake is on and its switch is closed while said generator is delivering power, comprising a first electro-magnetic relay means connected to said battery for completing a signal circuit from said battery to a signal device when said door controlled switch is actuated while said power consuming load device is consuming power, a second electro-magnetic relay means connected to said generator for rendering inoperative said circuit from said battery to said signal device while said generator is delivering power, and a brake signal circuit connecting said signal device to said generator and becoming operative when said emergency brake switch is closed while said generator is delivering power.

References Cited in the file of this patent
UNITED STATES PATENTS

| | | |
|---|---|---|
| 2,101,407 | Morland | Dec. 7, 1937 |
| 2,511,631 | Gordon | June 13, 1950 |
| 2,581,338 | LaRoza | Jan. 8, 1952 |
| 2,613,258 | Azano | Oct. 7, 1952 |
| 2,634,400 | Sweet | Apr. 7, 1953 |
| 2,722,673 | Turner | Nov. 1, 1955 |